United States Patent [19]

Steinecke et al.

[11] 4,142,488

[45] Mar. 6, 1979

[54] APPARATUS FOR PREVENTING EXCESSIVE RUNNING SPEED FOR INTERNAL COMBUSTION ENGINE, ESPECIALLY FOR MOTOR VEHICLES

[75] Inventors: Rudolf Steinecke, Weinstadt-Beutelsbach; Otto Göbke, Waiblingen; Klaus Gern, Waiblingen-Bittenfeld, all of Fed. Rep. of Germany

[73] Assignee: Daimler-Benz Aktiengesellschaft, Fed. Rep. of Germany

[21] Appl. No.: 742,344

[22] Filed: Nov. 16, 1976

[30] Foreign Application Priority Data

Nov. 21, 1975 [DE] Fed. Rep. of Germany ....... 2552186

[51] Int. Cl.$^2$ .................... F02D 37/00; F16D 43/24
[52] U.S. Cl. .................... 123/99; 123/103 E; 192/0.033; 192/104 F
[58] Field of Search ............... 123/99, 103 C, 103 R, 123/103 E; 60/906; 192/0.032, 0.033, 104 R, 104 F, 103 F

[56] References Cited

U.S. PATENT DOCUMENTS

| | | | |
|---|---|---|---|
| 1,967,730 | 7/1934 | Zadig | 192/103 F |
| 2,200,013 | 5/1940 | Sanford | 192/0.033 |
| 2,201,125 | 5/1940 | Freeman | 192/0.033 |
| 2,817,323 | 12/1957 | Nallinger | 123/103 E |
| 3,240,308 | 3/1966 | Frost | 192/104 F |
| 3,817,358 | 6/1974 | Hess | 192/104 R |
| 3,923,020 | 12/1975 | Gilligan | 123/103 C |

Primary Examiner—Charles J. Myhre
Assistant Examiner—Craig R. Feinberg
Attorney, Agent, or Firm—Craig & Antonelli

[57] ABSTRACT

Apparatus for preventing overspeeding of an engine is provided. In preferred embodiments, an hydraulically actuable clutch is controlled by a piston-cylinder arrangement connected to a driver operable clutch pedal. The rear side of the piston in this arrangement is selectively communicated with a high pressure air source and an exhaust space by means of a solenoid valve. The solenoid valve is controlled by a tachometer switch so that the same communicates the high pressure medium to automatically actuate the disengagement of the clutch whenever a predetermined set engine speed is exceeded. The pressure medium space at the side of the piston is also communicated with a further piston-cylinder arrangement for automatically forcing an engine accelerator pedal toward a no-load engine running condition at the same time the clutch is automatically disengaged. An emergency switch is provided for overriding the clutch disengaging apparatus so as to accommodate intentional usage of the engine as a brake.

10 Claims, 1 Drawing Figure

U.S. Patent
Mar. 6, 1979
4,142,488
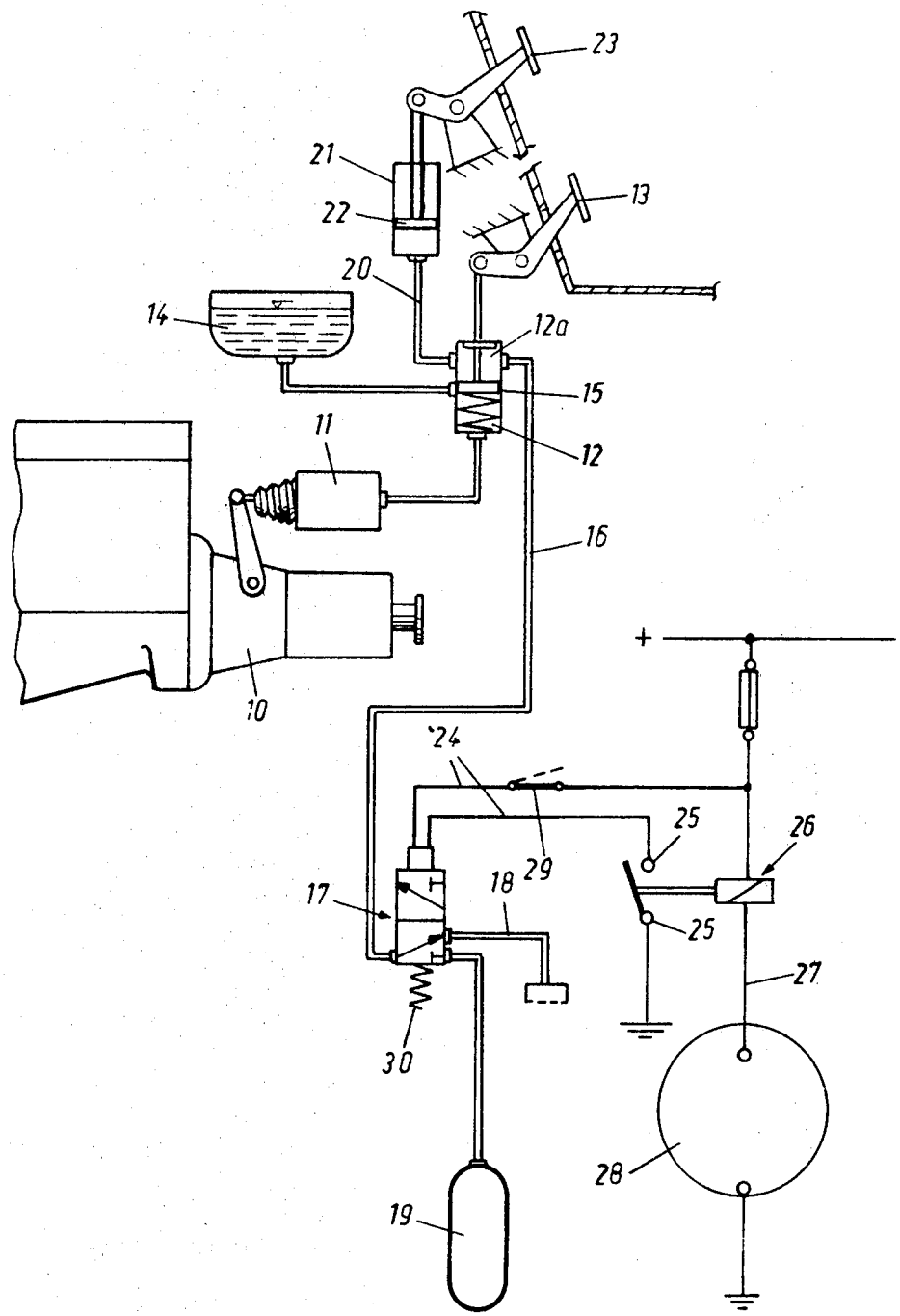

APPARATUS FOR PREVENTING EXCESSIVE RUNNING SPEED FOR INTERNAL COMBUSTION ENGINE, ESPECIALLY FOR MOTOR VEHICLES

BACKGROUND AND SUMMARY OF THE INVENTION

The present invention relates to apparatus for the avoidance of overspeeding of a combustion engine, especially an internal combustion engine for an automotive vehicle. More particularly, the invention relates to such an apparatus which utilizes a disengageable clutch which is connected in a drive train for the drive of an automotive vehicle, such as in conjunction with the shifting transmission.

It is known that considerable damage can result to an engine when it is operated at speeds above its highest desirable speed or rotational speed, especially if so operated for a long period of time. In certain circumstances with automotive vehicle engines, such damage can affect the safety of the vehicle, the vehicle passengers, and also other traffic vehicles. Since such overspeeding results often only from inattentiveness, the invention is directed to the problem of creating an arrangement which automatically undertakes the supervision of the running speed and the automatic initiation of appropriate counter-measures. Such an arrangement should preferably be simply constructable and operationally safe.

According to the invention, these above-noted problems are solved by providing effective adjustment apparatus for the clutch so as to automatically disengage the clutch upon the reaching of a predetermined speed of the engine. The selected predetermined speed for the apparatus is advantageously chosen such that it is slightly under the permissible highest operational speed of the engine, so that, considering the inertia of the apparatus, a proper disengagement of the gears is possible. According to preferred embodiments of the invention, the control is such that the clutch can be mechanical, pneumatic, hydraulic or electric. The control can also be specifically directly for the clutch itself, as well as also for its existent activating part or linkage.

The invention also contemplates the general idea of separating or interrupting the drive train from the engine or motor to the driving wheels automatically, in dependence on the reaching of a predetermined critical engine speed. The disengaging impulse for the drive train can, in practical appropriate embodiments, be controlled by engine speed dependent frequencies; e.g., in dependence upon the generator or a mechanical control signal. It is also contemplated within the framework of the invention for the selected predetermined engine speed to be made to be adjustable so as to accommodate certain desired different driving styles (sport driving or maximum economy driving, for example). It is also contemplated to coordinate different predetermined engine speeds for individual gears in order to prevent excessive speed operation in the lower gears during acceleration.

According to a further development of the inventive concept, the arrangement can be so constructed that the arrangement for activating the clutch is also effective to regulate the engine in the sense of an adjustment for no-load running. In this way, it is established in each case that the engine will not by chance run away (excessive overspeeding) if, for whatever reasons, the driver keeps his foot on the throttle pedal upon activation of the clutch disengaging apparatus of the invention.

Further, there are driving situations where, for safety reasons, an overrunning or overspeeding of the engine beyond the predetermined highest desired operational speed is necessary. For example, if the brakes fail, such intentional overspeeding may be required for braking purposes. For this reason, the present invention further proposes that an emergency switch or the like be provided for the intentional shut-off or cut-out of the control apparatus for the disengagement of the clutch.

Modern vehicle clutches are frequently hydraulically operated in such a manner that a first piston-cylinder arrangement directly controls the engagement and disengagement of the clutch, with a second piston-cylinder arrangement being operated by a clutch pedal in such a manner as to selectively apply pressure to the first cylinder arrangement. With such a clutch arrangement, the invention proposes that the second or activating cylinder connected with the clutch pedal, on the back side thereof, is pressurizable by a pressure medium controlled by a solenoid valve with the activating circuit for such solenoid valve being controlled in response to an engine speed responsive switch (tachometer switch) set to close the activating circuit when the engine exceeds a predetermined set speed.

The engine tachometer switch, in accordance with a first embodiment of the invention, operates so as to control the reengagement of the clutch after the slowing down of the engine below a selected speed, with consequent advantages of automatic continuous operation of the vehicle system. However, in accordance with a second preferred embodiment of the invention, the clutch is maintained in a disengaged position until further intentional activation of same by the vehicle driver. In this last-mentioned arrangement, the control of a relay for the solenoid valve is to be equipped with a stopping circuit, including a switch for controlling deactuation of the solenoid valve.

According to a further preferred embodiment of the invention, it is further proposed that the pressure medium supplied to the activating cylinder for controlling the clutch is also connected to a further pressure medium cylinder, the piston of which further cylinder is operable to move an engine speed control rod in a direction corresponding to a decreasing engine load upon the pressurization of the mentioned cylinders. In this way it will be in each case assured that the engine is returned to a no-load running speed situation irrespective of the position that the driver maintains his foot on the accelerator pedal.

DESCRIPTION OF THE DRAWING

The single FIGURE of the drawing schematically depicts details of a preferred embodiment of an arrangement constructed in accordance with the present invention.

Clutch 10 is hydraulically controlled, and includes engaging and disengaging linkage connected with piston-cylinder arrangement 11. Piston-cylinder arrangement 11 is pressurized in response to the pressure in piston-cylinder arrangement 12, which in turn is controlled by clutch pedal 13. A reservoir 14 is coordinated to the cylinder 12 in order to compensate for any eventual leakage losses of the hydraulic fluid. The just-described hydraulic clutch control operation is in itself known and therefore is not the subject of the present invention by itself.

The piston 15 in cylinder 12, which is normally activated by clutch pedal 13, has a space 12a at the rear thereof which is connected with line 16 for supplying pressurized air thereto. A solenoid valve 17 is arranged in the supply to line 16, which solenoid valve is configured to normally exhaust line 16 via line 18. However, upon actuation of solenoid valve 17, the supply to line 16 is connected with a pressurized air container 19. The space 12a in cylinder 12 is at the same time connected through the line 20 with a further pressure medium cylinder 21. The piston 22 in cylinder 21 is connected with an engine accelerator pedal or drive pedal 23 in such a manner that, upon pressurization of lines 16 and 20, the drive pedal 23 is automatically adjusted in the sense of a decreasing load (in the direction of no-load running of the motor).

The activating circuit 24 for the solenoid valve 17 is controlled by contact switch 25 of a relay 26. The activating circuit 27 for relay 26 is responsive to speed switch (tachometer or rotational speed responsive switch) 28. The tachometer switch 28 is preset at a predetermined engine speed which is slightly under the highest desired permissible speed for the engine. The tachometer switch 28 is usually in a position so as not to close the circuit 24 controlling the solenoid valve 17, but is movable in response to excessive engine speed over the predetermined set engine speed to activate the circuit 24 for the solenoid valve 17, with the resultant communication of high pressure chamber 19 with line 16. Activating circuit for solenoid 17 is also provided with an emergency switch 29, which is normally closed. The vehicle driver can intentionally open this switch 29 when he wishes to render the apparatus for deactivating the clutch inoperational.

As long as the engine operates under the preset selected speed for the tachometer switch 28, the solenoid valve 17 remains in the shown position. That means that the space 12a behind piston 15 is unpressurized. Consequently, the clutch 10 can be operated in the normal usual manner by way of clutch pedal 13, into and out of engagement. In the event the preset highest speed for the engine is exceeded, as determined by the tachometer switch 28, the relay 26 is automatically activated to close with its contact 25 the circuit 24 of the solenoid valve 17. The solenoid valve 17 operates against the spring 30 to move to its other position in which the space 12a of cylinder 12 is pressurized with high pressure air from the chamber 19. The piston 15 in cylinder 12 will also, in a manner exactly as if activated by clutch pedal 13, move so that the piston-cylinder arrangement 11 releases the clutch 10. This will separate the connection between the motor and the transmission so that the motor cannot exceed its highest desired speed. Simultaneously, the piston 22 in cylinder 21 is pressurized to therefore control the movement of accelerator pedal 23 in the direction of no-load running of the motor. Upon disengagement of the clutch, the motor returns to its no-load rotational speed or at least to a substantially reduced rotational speed.

Now if the tachometer 28 senses reduction of the engine speed below the predetermined high speed, the relay 26 is deactivated and the activating circuit 24 for the solenoid valve 17 is opened so that this valve 17 is switched again to the shown released condition. The space 12a then becomes again unpressurized and the clutch 10 is again engaged. In this situation it is very advantageous, according to the preferred embodiments of the invention, if special precautions are made to prevent oscillations of the system. For example, such can be provided at the tachometer 28 itself by way of a certain hysteresis in the tachometer system. Other possibilities contemplated by the invention are the arrangement of throttles in the exhaust lines 18 and, finally, the provision of a stopping circuit for the relay 26, which stopping circuit can only intentionally be further separated after the closing of switch 25 by relay 26. This last-mentioned arrangement is advantageous if one wants to undertake the reengagement of the clutch intentionally anyhow.

When it becomes absolutely necessary due to certain reasons of travel conditions to have an overspeeding of the engine, such as in the case of failure of brakes, then the driver can open the emergency switch 29 so as to separate and deactivate the circuit 24. In this condition, activation of the solenoid valve 17 is impossible by way of the tachometer switch 28 so that disengagement of the clutch is not effected and the motor can be used for braking.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Apparatus for preventing overspeeding of an engine which is drivingly connected via a drive train to a load, said apparatus comprising:

engine speed detecting means, and drive train interruption means responsive to said engine speed detecting means to automatically completely interrupt said drive train connection in response to engine speeds in excess of a predetermined set engine speed, whereby transmission of forces from said load to said engine to further increase the speed of the engine is prevented, wherein said drive train includes an hydraulically actuable clutch, a first piston-cylinder arrangement for directly moving said clutch into and out of engaged positions, a second piston-cylinder arrangement having its piston operably connected to a driver operated clutch pedal and including means for applying pressure to said first piston-cylinder arrangement to disengage said clutch when the clutch pedal is moved toward a clutch disengaging position, and wherein said drive train interruption means includes:

pressure medium line means opening into a pressure chamber in said second piston-cylinder arrangement at one side of said piston, high pressure medium chamber means, solenoid valve means interposed between said pressure medium line means and said high pressure medium chamber means and operable in a first valve position to communicate said high pressure medium chamber means with said pressure chamber so that said piston is moved to a position to disengage said clutch irrespective of the position of the clutch pedal, said solenoid valve means being operable in a second valve position to exhaust said pressure medium line means so that said piston is controlled only by the clutch pedal position, and control circuit means for activating said solenoid valve means to said first valve position in response to engine speeds in excess of said predetermined speed.

2. Apparatus according to claim 1, wherein said control circuit means includes a tachometer switch which closes an activating circuit for said solenoid valve means whenever said engine exceeds said predetermined speed.

3. Apparatus according to claim 2, further comprising a control pedal for directly controlling the engine, and wherein the pressure chamber in said second piston-cylinder arrangement is communicated with a third piston-cylinder arrangement connected to said control pedal in such a manner that the control pedal is simultaneously automatically adjusted toward a no-load engine running condition when said high pressure medium is communicated to said pressure chamber of said second piston-cylinder arrangement to disengage said clutch.

4. Apparatus according to claim 3, wherein said control pedal is a gas pedal for controlling the supply of fuel to the engine.

5. Apparatus for preventing overspeeding of an engine which is drivingly connected via a drive train to a load, said apparatus comprising:
   an hydraulically actuable clutch disposed in said drive train and being operable to completely interrupt the driving connection between said load and said engine when in a clutch disengaged position,
   a first piston-cylinder arrangement for directly moving said clutch between respective engaged and disengaged positions,
   a second piston-cylinder arrangement having its piston operably connected to an operator controllable clutch pedal and including means for applying pressure to said first piston-cylinder arrangement to disengage said clutch when the clutch pedal is moved toward a clutch disengaging position,
   pressure medium line means opening into a pressure chamber in said second piston-cylinder arrangement at one side of said piston,
   high pressure medium chamber means,
   solenoid valve means interposed between said pressure medium line means and said high pressure medium chamber means and operable in a first valve position to communicate said high pressure medium chamber means with said pressure chamber so that said piston is moved to a position to disengage said clutch irrespective of the position of the clutch pedal, said solenoid valve means being operable in a second valve position to exhaust said pressure medium line means so that said piston is controlled only by the clutch pedal position operated by the operator,
   said control circuit means for activating said solenoid valve means to said first valve position in response to detection of engine speeds in excess of a predetermined speed.

6. Apparatus according to claim 5, wherein said control circuit means includes a tachometer switch which closes an activating circuit for said solenoid valve means whenever said engine exceeds said predetermined speed.

7. Apparatus according to claim 6, further comprising a control pedal for directly controlling the engine, and wherein the pressure chamber in said second piston-cylinder arrangement is communicated with a third piston-cylinder arrangement connected to said control pedal in such a manner that the control pedal is simultaneously automatically adjusted toward a no-load engine running condition when said high pressure medium is communicated to said pressure chamber of said second piston-cylinder arrangement to disengage said clutch.

8. Apparatus for preventing overspeeding of an engine which is drivingly connected via a drive train to a load, said apparatus comprising:
   engine speed detecting means,
   and drive train interruption means responsive to said engine speed detecting means to automatically interrupt said drive train connection in response to engine speeds in excess of a predetermined set engine speed,
   wherein said drive train includes an hydraulically actuable clutch,
   a first piston-cylinder arrangement for directly moving said clutch into and out of engaged positions,
   a second piston-cylinder arrangement having its piston operably connected to a driver operated clutch pedal and including means for applying pressure to said first piston-cylinder arrangement to disengage said clutch when the clutch pedal is moved toward a clutch disengaging position,
   and wherein said drive train interruption means includes:
   pressure medium line means opening into a pressure chamber in said second piston-cylinder arrangement at one side of said piston, high pressure medium chamber means,
   solenoid valve means interposed between said pressure medium line means and said high pressure medium chamber means and operable in a first valve position to communicate said high pressure medium chamber means with said pressure chamber so that said piston is moved to a position to disengage said clutch irrespective of the position of the clutch pedal, said solenoid valve means being operable in a second valve position to exhaust said pressure medium line means so that said piston is controlled only by the clutch pedal position,
   said control circuit means for activating said solenoid valve means to said first valve position in response to engine speeds in excess of said predetermined speed,
   wherein said control circuit means includes a techometer switch which closes an activating circuit for said solenoid valve means whenever said engine exceeds said predetermined speed,
   further comprising a control pedal to directly controlling the engine, and wherein the pressure chamber in said second piston-cylinder arrangement is communicated with a third piston-cylinder arrangement connected to said control pedal in such a manner that the control pedal is simultaneously automatically adjusted toward a no-load engine running condition when said high pressure medium is communicated to said pressure chamber of said second piston-cylinder arrangement to disengage said clutch.

9. Apparatus according to claim 8, wherein said control pedal is a gas pedal for controlling the supply of fuel to the engine.

10. Apparatus comprising:
    an hydraulically actuable clutch,
    a first piston-cylinder arrangement for directly moving said clutch between respective engaged and disengaged positions, a second piston-cylinder arrangement having its piston perably connected to an operator controllable clutch pedal and including means for applying pressure to said first piston-cylinder arrangement to disengage said clutch when the clutch pedal is moved toward a clutch disengaging position, pressure medium line means opening into a pressure chamber in said second piston-cylinder arrangement at one side of said piston, high pressure medium chamber means, solenoid valve means interposed between said pressure medium line means and said high pressure medium chamber means and operable in a first valve position to communicate said high pressure medium chamber means with said pressure chamber so that said piston is moved to a position to disengage said clutch irrespective of the position of the clutch pedal, said solenoid valve means being operable in a second valve position to exhaust said pressure medium line means so that said piston is controlled only by the clutch pedal position operated by the operator, and control circuit means for activating said solenoid valve means to said first valve position in response to detection of engine speeds in excess of a predetermined speed, wherein said control circuit means includes a tachometer switch which closes an activating circuit for said solenoid valve means whenever said engine exceeds said predetermined speed, further comprising a control pedal for directly controlling the engine, and wherein the pressure chamber in said second piston-cylinder arrangement is communicated with a third piston-cylinder arrangement connected to said control pedal in such a manner that the control pedal is simultaneously automatically adjusted toward a no-load engine running condition when said high pressure medium is communicated to said pressure chamber of said second piston-cylinder arrangement to disengage said clutch.

* * * * *